United States Patent [19]

Riseman, deceased et al.

[11] Patent Number: 4,800,442
[45] Date of Patent: Jan. 24, 1989

[54] APPARATUS FOR GENERATING AN IMAGE FROM A DIGITAL VIDEO SIGNAL

[75] Inventors: John H. Riseman, deceased, late of Cambridge, Mass., by Jean M. Riseman, executrix; John J. Smith, Cambridge; Alice M. d'Entremont, Boston; Craig E. Goldman, Natick, all of Mass.

[73] Assignee: Canon Kabushiki Kaisha, Tokyo, Japan

[21] Appl. No.: 51,154

[22] Filed: May 18, 1987

Related U.S. Application Data

[63] Continuation of Ser. No. 931,941, Nov. 19, 1986, abandoned, which is a continuation of Ser. No. 765,938, Aug. 15, 1985, abandoned.

[51] Int. Cl.[4] .............................................. H04N 1/40
[52] U.S. Cl. .................................... 358/280; 358/283; 358/298
[58] Field of Search ............... 358/280, 283, 284, 296, 358/298, 302

[56] References Cited

U.S. PATENT DOCUMENTS

| | | | |
|---|---|---|---|
| 3,197,558 | 7/1965 | Ernst | 358/302 |
| 3,230,303 | 1/1966 | Macovski | 358/283 |
| 3,393,269 | 7/1968 | Zeuthen | 358/298 |
| 3,461,229 | 8/1969 | Oppenheimer | 358/296 |
| 3,643,016 | 2/1972 | Dattilo | 358/260 |
| 3,882,270 | 5/1975 | Ogawa | 358/260 |
| 3,916,096 | 10/1975 | Everett | 358/283 |
| 3,965,290 | 6/1976 | Tisue | 358/280 |
| 4,040,094 | 8/1977 | Everett | 358/283 |
| 4,329,717 | 5/1982 | Logie | 358/282 |
| 4,346,409 | 8/1982 | Ishida | 358/280 |
| 4,400,740 | 8/1983 | Traino | 358/285 |
| 4,467,364 | 8/1984 | Konagaya | 358/284 |
| 4,485,408 | 11/1984 | Kamizyo | 358/283 |
| 4,535,413 | 9/1985 | Shiota | 358/80 |
| 4,593,297 | 6/1986 | Suzuki | 358/283 |
| 4,626,923 | 12/1986 | Yoshida | 358/283 |

FOREIGN PATENT DOCUMENTS 50-017919 2/1975 Japan .
2120896 1/1987 United Kingdom .

OTHER PUBLICATIONS

"Declaration Submitted Pursuant to 37 C.F.R. §1.56 and M.P.E.P. §609" by Applicants.
Science, vol. 224, p. 44
Press release of Demonics Ltd., Feb. 24, 1984.
Four (4) pages prepared on Demonics ETP-1 Electronic Technical Publishing System.

Primary Examiner—Howard W. Britton
Attorney, Agent, or Firm—Fitzpatrick, Cella, Harper & Scinto

[57] ABSTRACT

An apparatus for generating a high quality image from a digital video signal includes a system for gamma correcting the digital video signal with a digital look up table and for converting the resultant digital signal to an analog video signal. Another circuit generates a triangular wave reference pattern signal and a comparator compares the analog video signal with the triangular wave reference pattern signal to form a pulse-width-modulated signal. A raster scanning print engine producing, for example, a laser beam, scans over a recording medium in accordance with the pulse-width-modulated signal, thereby forming an image of high quality on the recording medium of a print engine. This apparatus can also be used with an analog video signal by first converting the analog video signal to a digital video signal with an analog to digital converter.

96 Claims, 13 Drawing Sheets

| ADDRESS | DATA | 6BIT VIDEO SIGNAL | |
|---|---|---|---|
| 00H | | 00H | |
| 01H | | 01H | |
| 02H | | 02H | |
| 03H | | 03H | |
| 04H | | 04H | TABLE 1 |
| ⋮ | ⋮ | ⋮ | |
| 3DH | | 3DH | |
| 3EH | | 3EH | |
| 3FH | | 3FH | |
| 40H | | 00H | |
| 41H | | 01H | |
| 42H | | 02H | |
| 43H | | 03H | |
| ⋮ | ⋮ | ⋮ | TABLE 2 |
| 7EH | | 3EH | |
| 7FH | | 3FH | |
| 80H | | 00H | |
| ⋮ | ⋮ | ⋮ | TABLE 3 |
| BFH | | 3FH | |
| C0H | | 00F | |
| ⋮ | ⋮ | ⋮ | TABLE 4 |
| FFH | | 3FH | |

FIG. 8

| LINE 1 | TABLE 1 |
| LINE 2 | TABLE 2 |
| LINE 3 | TABLE 3 |
| LINE 4 | TABLE 4 |
| LINE 5 | TABLE 1 |
| LINE 6 | TABLE 2 |
| LINE 7 | TABLE 3 |

| LINE N-2 | TABLE 1 |
| LINE N-1 | TABLE 2 |
| LINE N-1 | TABLE 3 |
| LINE N | TABLE 4 |

FIG. 10 (a)

A PERIOD OF SCREEN - CLK

| | | | | | | | | |
|---|---|---|---|---|---|---|---|---|
| LINE 1 | 1 | 3 | 1 | 3 | 1 | | 1 | 3 |
| LINE 2 | 2 | 4 | 2 | 4 | 2 | | 2 | 4 |
| LINE 3 | 3 | 1 | 3 | 1 | 3 | | 3 | 1 |
| LINE 4 | 4 | 2 | 4 | 2 | 4 | | 4 | 2 |
| LINE 5 | 1 | 3 | 1 | 3 | 1 | | 1 | 3 |
| LINE 6 | 2 | 4 | 2 | 4 | 2 | | 2 | 4 |

| | | | | | | | | |
|---|---|---|---|---|---|---|---|---|
| LINE N 3 | 1 | 3 | 1 | 3 | 1 | | 1 | 3 |
| LINE N-2 | 2 | 4 | 2 | 4 | 2 | | 2 | 4 |
| LINE N-1 | 3 | 1 | 3 | 1 | 3 | | 3 | 1 |
| LINE N | 4 | 2 | 4 | 2 | 4 | | 4 | 2 |

FIG. 10 (b)

APPARATUS FOR GENERATING AN IMAGE FROM A DIGITAL VIDEO SIGNAL

This application is a continuation of application Ser. No. 931,941 filed 11/19/86, now abandoned, which was a continuation of application Ser. No. 765,938 filed 8/15/85, now abandoned.

BACKGROUND OF THE INVENTION

1. Field of the Invention

The present invention relates to an apparatus for generating an image from a digital video input signal. The apparatus is improved so as to reproduce an image with high quality.

2. Description of the Prior Art

In the past, methods generally referred to as the dither method and the density pattern method have been proposed for reproducing images of half tones. These known methods, however, cannot provide satisfactory gradation of dot size when the size of the threshold dot matrix is small and, therefore, require the use of a threshold matrix having a larger size. This is turn reduces the resolution and undesirably allows the texture of the image to appear too distinctive due to the periodic structure of the matrix. Therefore, deterioration of the quality of the output image results.

In order to mitigate the above described problems, it has been proposed to modify the dither method so as to allow finer control of the dot size by the use of a plurality of dither matrices. This method, however, requires a complicated circuit arrangement for obtaining synchronism of operation between the dither matrices so that the system as a whole is large in size, complicated in construction, and slow. Thus, there is a practical limit in the incremental increase of dot size and the resultant increment of density available by the use of a plurality of dither matrices. In U.S. Pat. No. 3,916,096, a method of improving the conventional screening process is described. As set forth in this U.S. Pat. No. 3,916,096, at column 8, lines 19 through 31:

> The conventional screening process when applied to a scanned image can be regarded as a form of pulse-width-modulation whereby a line of length X is laid down and repeated at intervals of Y. The percentage transmission (or reflection) of the reproduced image is then Y−X/Y [sic. should read (Y−X)/Y]. To be a linear process (Y−X) must be directly proportional to the amplitude of the scanned video signal where the signal amplitude represents the percentage optical transmission of the recorded original image. A way of achieving this is by comparing the amplitude of the video signal with a sawtooth wave form and laying a line forming a portion of a dot whenever the sawtooth is larger than the video signal.

See also U.S. Pat. No. 4,040,094, which relates to similar subject matter.

However, even if the method described in this patent is used in an apparatus for reproduction of an image, the precision of gradation reproduction deteriorates due to the delay of response of the apparatus.

The conventional method described in U.S. Pat. No. 3,916,096, produces a linear mapping from the analog video signal to the pulse-width-modulated signal. As is known in the art of printing, this linear mapping does not produce acceptable results because of the non-linear distortions introduced in the half-tone printing process, in particular when used with a laser beam print engine. Therefore, to obtain high quality half-tone printing, a method of non-linear mapping must be found. And, the method disclosed in the noted U.S. Patent, as quoted above, uses a complex arrangement to allow the use of different sawtooth waveforms on successive scans.

SUMMARY OF THE INVENTION

Accordingly, an object of the present invention is to provide an image processing apparatus, for generating an image from a digital video signal, that can overcome the problems of the prior art described above.

Another object of the present invention is to provide an image processing apparatus, for generating an image from a digital video signal, that permits reproduction of images with high quality.

Still another object of the present invention is to provide an image processing apparatus, for generating an image from a digital video signal, that can provide, with a very simple arrangement, a superior quality half-tone image.

Another object of the present invention is to provide an image processing apparatus, for generating an image from a digital video signal, that permits reproduction of images with high quality at high speed.

A further object of the present invention is to provide an image processing apparatus, for generating an image from a digital video signal, that can reproduce tone information with a high gradation and without impairing resolution.

Still another object of the present invention is to provide an image processing apparatus that can correct the tonal properties of the video image by providing a non-linear mapping of the video signal onto a pulse-width-modulated signal with a very flexible arrangement.

In accordance with a preferred embodiment, the image processing apparatus of the present invention processes a digital image input signal and includes a raster scanning print engine for generating a series of successive scanning lines. A pulse-width-modulated signal generator generates a pulse-width-modulated signal from a digital image input signal input to the apparatus. A circuit then applies the pulse-width-modulated signal to the print engine to cause it to generate each line as a succession of line segments. The lengths of the line segments are controlled to produce a variable density line screen from the line segments with the line screen comprising a plurality of columns of the line segments.

In accordance with another aspect of a preferred embodiment of the present invention, the image processing apparatus includes a pattern signal generator for generating a pattern signal of predetermined period. A pulse-width-modulated signal generator then generates a pulse-width-modulated signal in accordance with the video signal and the pattern signal that can be utilized by a raster scanning print engine or image forming device to form an image.

More specifically, the print engine scans lines on a recording medium with a beam in accordance with the pulse-width-modulated signal, and a synchronizing signal generator generates a synchronizing signal for each line scanned on the recording medium. The pattern signal generator generates the pattern signal of predetermined period in accordance with the synchronizing signal.

In accordance with still another aspect of the invention, the digital input signal has a characteristic, and a characteristic converting device converts the characteristic in order to produce a converted digital video signal. This signal is converted to an analog video signal by a digital to analog converter. A pulse-width-modulated signal is thereafter generated from this analog video signal and the pattern signal.

Other aspects, features, and advantages of the present invention will become apparent from the following detailed description of the preferred embodiments taken in conjunction with the accompanying drawing, as well as from the concluding claims.

BRIEF DESCRIPTION OF THE DRAWING

FIG. 3 shows how

FIG. 8 is an illustration of a look-up table of a gamma converting ROM 12;

FIGS. 10(a) and 10(b) illustrate the relationship between the scanning lines and the conversion table as used;

DESCRIPTION OF THE PREFERRED EMBODIMENTS

A preferred embodiment of the invention will be described in detail herein with reference to the accompanying drawing.

Figure 1:
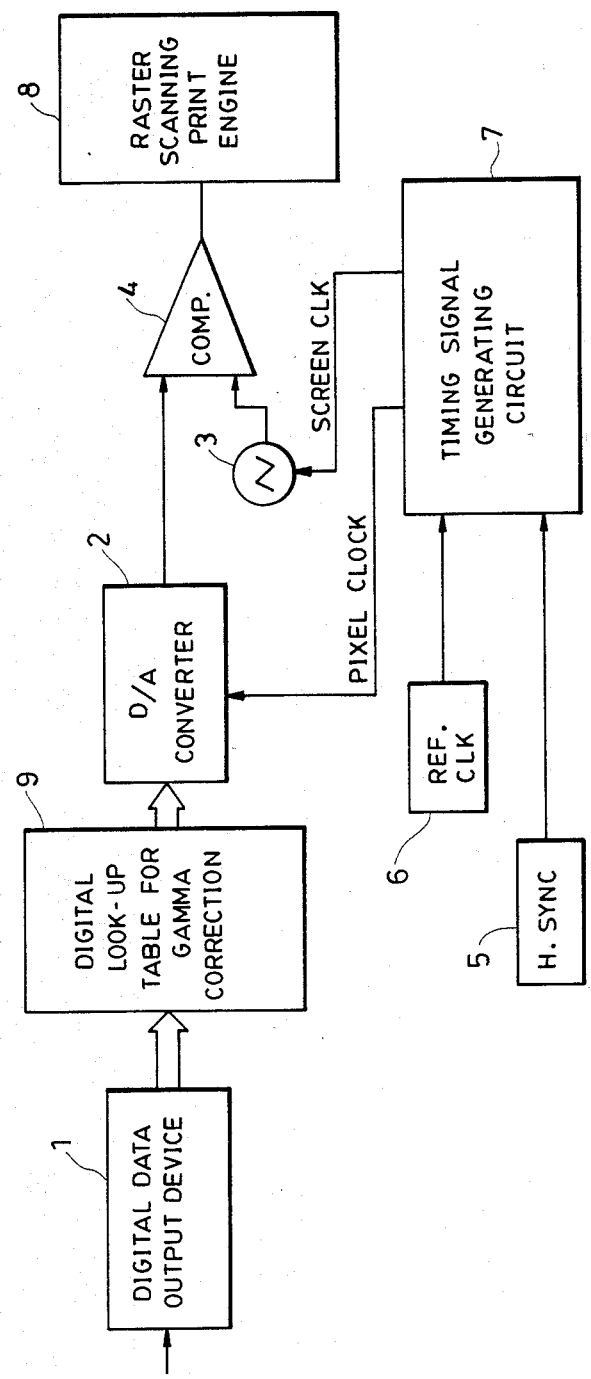
FIG. 1 is a simplified schematic illustration of a preferred embodiment of the apparatus for generating an image from a digital video signal in accordance with the present invention.

Referring first to FIG. 1 schematically showing an embodiment of the invention, a digital data output device 1 is adapted to receive an analog video data from a CCD sensor or a video camera (neither of which is shown) and to perform an A/D (analog-to-digital) conversion of the analog video signal so as to convert that signal into a digital video signal, where each picture element (pixel) is represented by a predetermined number of bits carrying tone information. The digital video signal may be temporarily stored in a memory or, alternatively, may be supplied from an external device by, for example, telecommunication. The signal from the digital data output device 1 is used as the address for a digital look-up table for gamma correction 9. The resultant output, which in the preferred embodiment is an eight (8) bit digital number ranging from 00H to FFH representing 256 possible tonal gradation levels as described further below, is converted back into an analog signal by means of a D/A (digital to analog) converter 2 so as to form an analog signal which is updated for each picture element. The analog video signal representing the picture elements is fed to one of the input terminals of a comparator circuit 4. Simultaneously, analog reference pattern signals having a triangular waveform are produced by a pattern signal generator 3 at a period corresponding to the desired pitch of the half-tone screen. The pattern signals (a triangle wave) are fed to the other input terminal of the comparator circuit 4. Meanwhile a horizontal synchronizing signal generating circuit 5 generates horizontal synchronizing signals for respective lines, while an oscillator (reference clock generating circuit) 6 generates reference clocks. In synchronism with the horizontal synchronizing signal, a timing signal generating circuit 7 counts down the reference clocks, to, for example, ¼ period. The signal derived from the timing signal generating circuit 7 is used as the clock for the transfer of the digital video signal and also as the latch timing signal for the D/A converter 2.

In the embodiment described, since the apparatus is intended for use in a laser beam printer, the horizontal synchronizing signal corresponds to a beam detect (BD) signal which is known per De. The comparator circuit 4 compares the level of the analog video signal with the level of the pattern signal of triangular waveform and produces a pulse-width-modulated signal. The pulse-width-modulated signal is supplied to, for example, the laser modulator circuit of a raster scanning print engine 8 for modulating the laser beam. As a result, the laser beam is turned on and off in accordance with the pulse width thereby forming a half-tone image on the recording medium of the raster scanning print engine 8.

Figure 2:
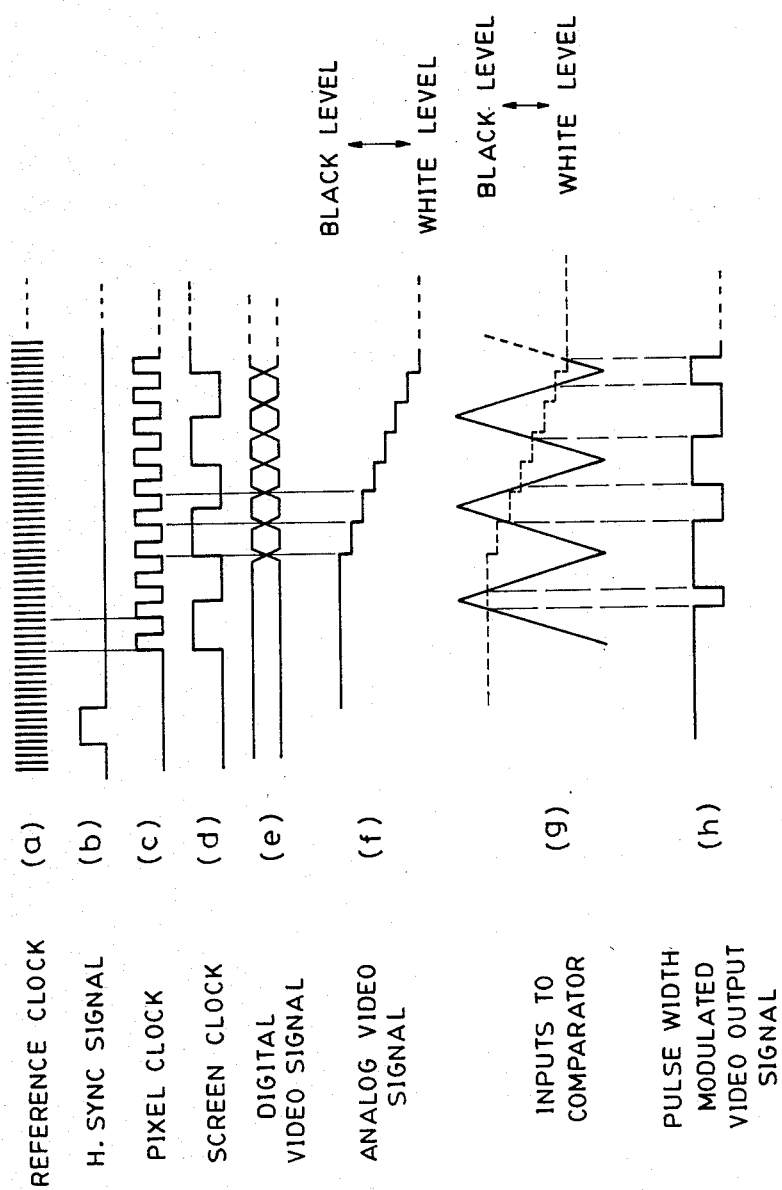
FIG. 2 shows waveforms of signals obtained at different portions of the apparatus for generating an image from a digital video signal shown in FIG. 1.

FIG. 2 shows the waveforms of signals obtained in certain components of the apparatus shown in FIG. 1. More specifically, the portion (a) of FIG. 2 diagrammatically shows the reference clocks generated by the oscillator 6, while the portion (b) shows the horizontal synchronizing signal mentioned above. The portion (c) shows the pixel clocks which are produced by counting down the reference clocks with the timing signal generating circuit 7. More specifically, the pixel clock shown in the portion (c) of FIG. 2 is the signal which is obtained by counting down the reference clocks into ¼ period by the operation of the timing signal generating circuit 7 in synchronism wit the horizontal synchronizing signal. The pixel clock thus obtained is delivered to the D/A converter 2 to be used as the digital video signal transfer clock. The portion (d) of FIG. 2 shows the pattern signal synchronizing clock (screen clock) which is obtained by counting down the reference clock into 1/12 period by operation of the timing signal generating circuit 7 in synchronism with the horizontal synchronizing signal. In the illustrated case, one pattern signal synchronizing clock is generated for every three pixel clocks. The pattern signal synchronizing or screen clock thus obtained is delivered to the pattern signal generator 3 to be used as the synchronizing signal in the generation of the pattern signal. The portion (e) of FIG. 2 shows the digital video signal which is output from the digital data output device 1. And the portion (f) shows the analog video signal after the D/A conversion conducted by the D/A converter 2. It will be seen from the portions of FIG. 2 that picture element data of analog level are produced in synchronism with the pixel clocks. It will also be seen that the density of image becomes higher, i.e., approaches black, as the level of the analog video signal rises.

As shown by a solid line curve in the portion (g) of FIG. 2, the output from the pattern generator 3 is obtained in synchronism with the clocks shown in the portion (d) and is input to the comparator circuit 4. The broken line curve in the portion (g) of FIG. 2 shows the analog video signal shown in the portion (f). This video signal is compared by the comparator circuit 4 with the pattern signal of triangular waveform derived from the pattern signal generator 3 so that the analog video signal is converted into a pulse-width-modulated signal as shown in the portion (h) of FIG. 2.

The described embodiment of the invention permits a substantially continuous or linear pulse modulation and, hence, ensures a high gradation of the image output by virtue of the fact that the digital video signal is converted into an analog video signal which is then compared with the triangular wave signal of a predetermined period.

It is to be noted also that, in the described embodiment of the invention, the pattern signal synchronizing clock (screen clock) for generation of the pattern signal, e.g., the triangular wave signal, is generated in synchronism with the horizontal synchronizing signal by making use of reference clocks having a frequency much higher than that of the pattern signal synchronizing signal. Therefore, the jitter of the pattern signal derived from the pattern signal generator 3, e.g., the offset of the pattern signal from one scan line to the next, is reduced to less than 1/12 of the period of the pattern signal. This precision is required to insure a high quality half-tone reproduction in which the line screen is formed uniformly and smoothly from one scan line to the next. Therefore, the density information can be accurately pulse-width modulated by making use of this pattern signal which has a small fluctuation, so that the image can be reproduced with high quality.

Figure 4:
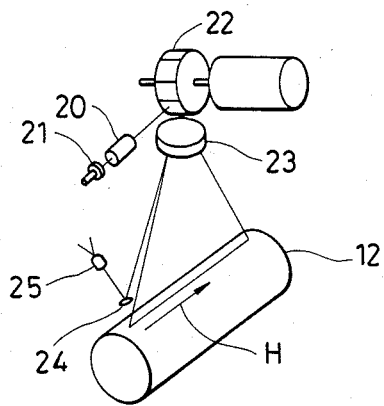
FIG. 4 is a schematic illustration of an optical scanning system in a laser beam printer to which the invention is applicable.

FIG. 4 is a schematic perspective view of the optical scanning system incorporated in the laser beam printer (a raster scanning print engine) to which the present invention is applied. The scanning system has a semiconductor laser adapted to emit a laser beam modulated in accordance with the pulse-width-modulated signal mentioned above.

The optical laser beam modulated by the semiconductor laser 21 is collimated by a collimator lens 20 and is optically deflected by a polygonal mirror (applying means) 22 having a plurality of reflecting surfaces. The deflected beam is focused to form an image on a photosensitive drum 12 by an image forming lens 23 referred to an fθ lens, so as to scan the drum 12. During the scanning by the beam, and when the beam reaches the end of each scanning line, it is reflected by a mirror 24 and is directed to a beam detector 25. The beam detection (BD) signal produced by the beam detector 25 is used as the horizontal synchronizing signal as is known. Thus, in the described embodiment, the horizontal synchronizing signal is constituted by the BD signal.

It will be seen that the BD signal is detected for each of the lines of scanning by the laser beam and is used as the timing signal for the transmission of the pulse-width-modulated signal to the semiconductor laser.

As used in the subject specification in description of the preferred embodiments and as used in the concluding claims, the term "line-segment" means a dot which is formed on a recording medium, the length (size) of which is variable in accordance with the width of the pulse width in the supplied pulse-width-modulated signal.

The apparatus for generating an image from a digital video signal of the invention will be described more fully with specific reference to FIGS. 3A and 3B which show details of the apparatus shown in FIG. 1.

As stated before, the preferred embodiment described herein makes use of the BD signal as the horizontal synchronizing signal. The BD signal, however, is basically asynchronous with the pixel clock and, therefore, would normally cause jitter in the horizontal direction. In the described embodiment, therefore, jitter is reduced to less than ¼ of the width of a pixel, by making use of an oscillator 100 that can produce reference clocks (72M-CLK) (72 megahertz clock) of a frequency which is 4 times higher than that of the pixel clocks. A BD synchronizing circuit 200 is used for this purpose. The reference clock (72M-CLK) from the oscillator 100 is supplied to D latches 201, 202, and 203 through a buffer 101, while the BD signal is input to the data terminal D of the D latch 201 through a terminal 200a so as to be synchronized with the reference clocks. In addition, the BD signal is delayed by the D latches 202 and 203 by an amount corresponding to 2 (two) reference clock pulses. The BD signal thus delayed is delivered to one of the input terminals of a NOR gate 103, while the other input terminal of the NOR gate 103 receives the inverted output of the D latch 201. The output from the NOR gate 103 is input to one of the input terminals of a NOR gate 104, while the other input terminal of the NOR gate 104 receives the output of a flip-flop circuit 102.

With this arrangement, the flip-flop circuit 102 produces clocks (36M-CLK) (36 megahertz clock) which are obtained by dividing the frequency of the reference clock by 2 (two). Thus, the output (36M-CLK) from the flip-flop circuit 102 is synchronous with the BD signal to within one period of the clock 72M-CLK.

The output of the D latch 203 is delayed by the D latches 204, 205, and 206 by an amount corresponding to 3 (three) pulses of the output (36M-CLK) of the flip-flop circuit 102.

The inverted output from the D latch 201 and the output from the D latch 206 are delivered to a NOR gate 207, so that an internal horizontal synchronizing signal (BD-Pulse) is formed in synchronism (within one period) with the reference clock.

Figure 5:
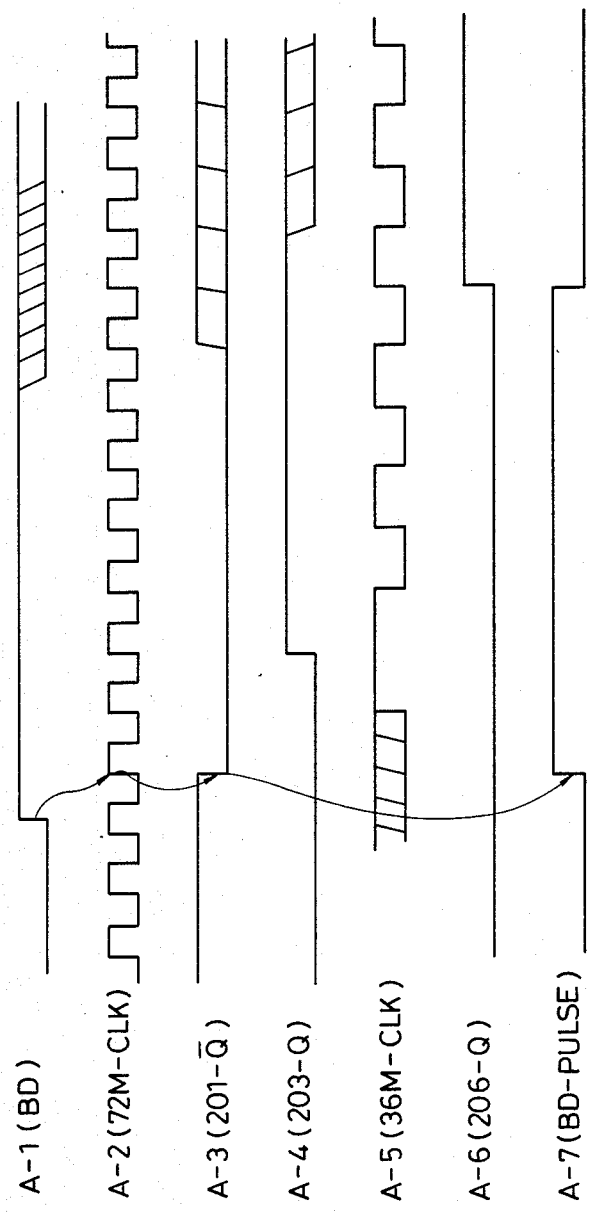
FIG. 5 shows waveforms of signals obtained at different portions of the circuit shown in FIGS. 3A and 3B.

FIG. 5 shows the timing of the signals obtained at various portions of the BD synchronizing circuit 200. More specifically, A-1 shows the BD signal, A-2 shows the reference clock (72M-CLK) produced by the oscillator 100, and A-3 shows the inverted output from the D latch 201, obtained by synchronizing the BD signal with the reference clock (72M-CLK). A-4 shows the output from the D latch 203, obtained by delaying the signal A-3 by an amount corresponding to 2 (two) reference clock pulses. A-5 shows the clock (36M-CLK) output from the flip-flop circuit 102, A-6 shows the output from the D latch 206, obtained by delaying the signal A-4 by an amount corresponding to 3 (three) pulses of the clocks (36M-CLK), and A-7 shows the internal horizontal synchronizing (BD-Pulse). It will be seen that the internal horizontal synchronizing signal (BD-Pulse) rises in synchronism with the rise of the first reference clock (72M-CLK) after the rise of the BD signal, and is held at level "1" for a period corresponding to 8 (eight) pulses of the reference clock. This internal horizontal synchronizing signal (BD-Pulse) constitutes the reference for the horizontal driving of the circuit of this embodiment.

An explanation of the video signals will now be made again with reference to FIGS. 3A and 3B. The pixel clocks (PIXEL-CLK) are formed by dividing the frequency of the signal (36M-CLK) by 2 (two) by means of the J-K flip-flop circuit 105. A 6-bit digital video signal is latched in the D latch 10 by the pixel clock (PIXEL-CLK), and the output is delivered to a ROM 12 for gamma conversion. The 8-bit video signal produced through the conversion by the ROM 12 is further converted into an analog signal by the D/A converter 13 and is delivered to one of the input terminals of the comparator 15 in order to be compared with the triangular wave signal explained below. The pulse-width-modulated signal obtained as a result of the comparison is delivered to the laser driver of a raster scanning print engine.

Figure 3A:
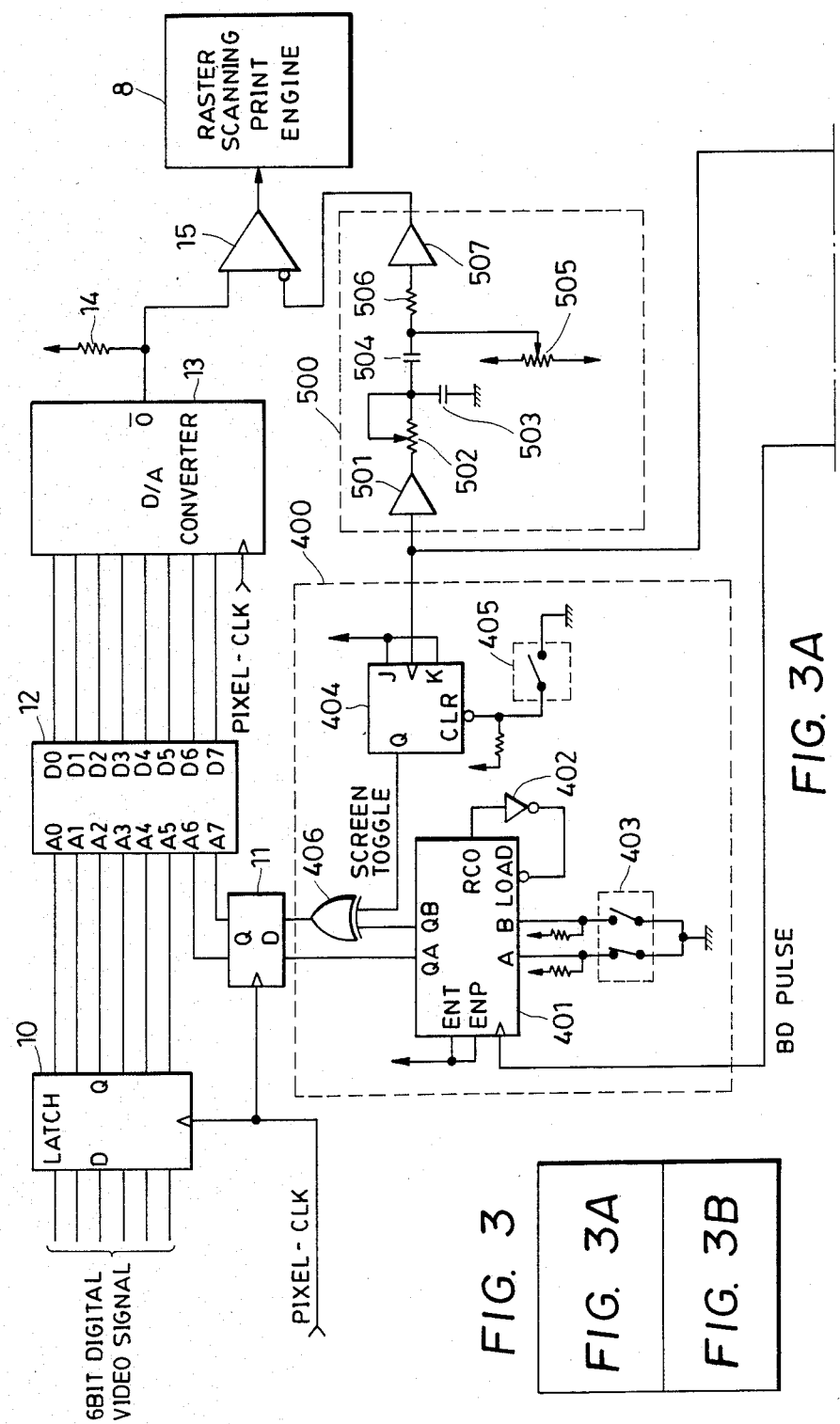
FIGS. 3A and 3B are assembled together to illustrate details of the embodiment of the apparatus for generating an image from a digital video signal shown in FIG. 1.
Figure 3B:
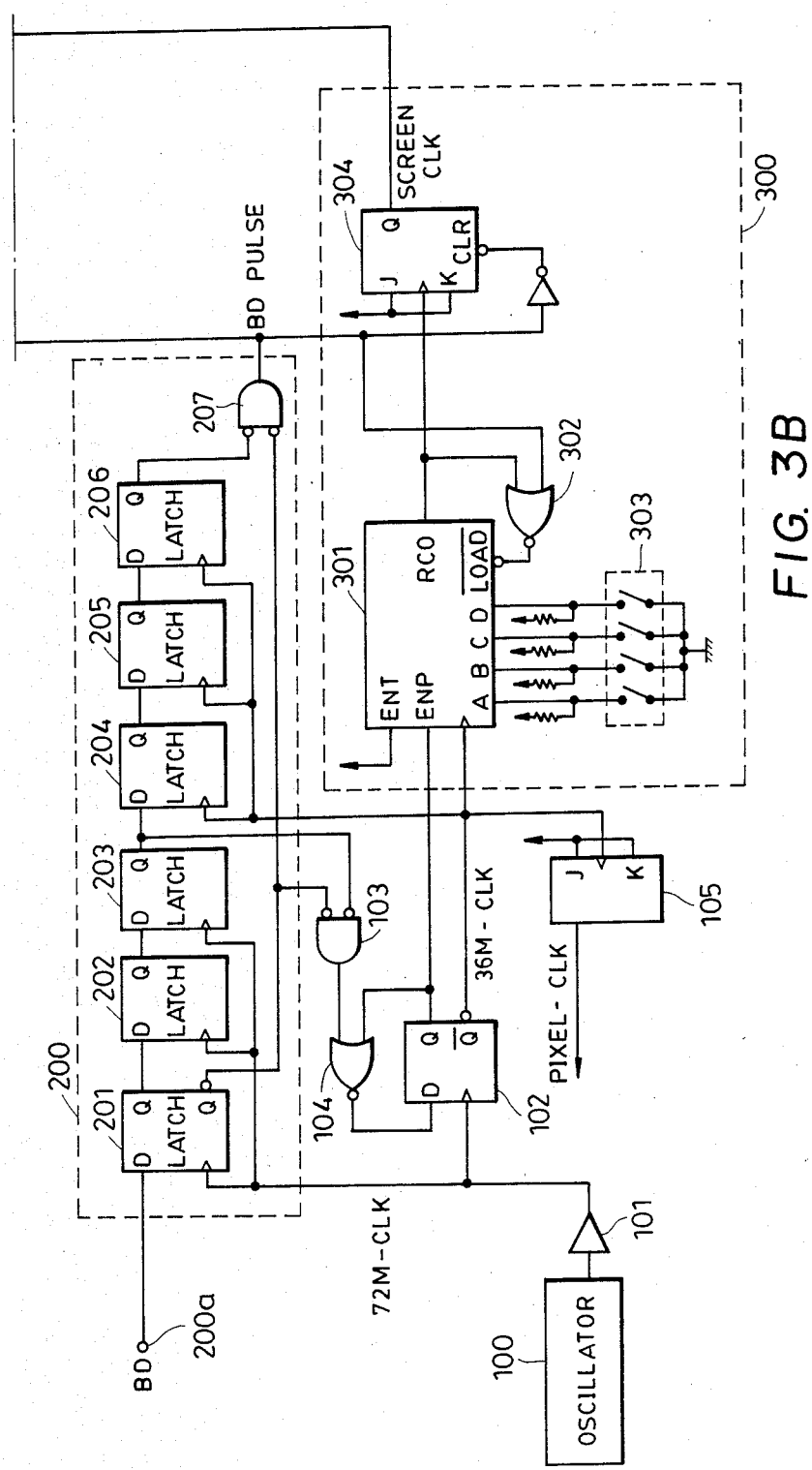

Still referring to FIGS. 3A and 3B, reference numeral 300 designates a screen clock generating circuit which generates the screen clock, i.e., the analog reference pattern signal synchronizing clock, which is used as the reference for the generation of the triangular wave signal. A counter 301 is used as a frequency divider for dividing the frequency of the signal (36M-CLK) output from the flip-flop circuit 102. The counter 301 has input terminals D, C, B, and A which are preset with predetermined data by means of a switch 303. The ratio of the frequency division is determined by the values set at these input terminals D, C, B, and A. For instance, when the values "1", "1", "0", and "1" are set in the terminals D, C, B, and A, respectively, the frequency of the signal (36M-CLK) is divided into ⅓.

Meanwhile, horizontal synchronization is attained by the NOR gate 302 and the (BD-Pulse) signal. The frequency of the divided signal is further divided into ½ by a J-K flip-flop circuit 304, so that a screen clock having a duty ratio of 50% is formed. A triangular wave generating circuit 500 generates triangular waves by using this screen clock as the reference.

Figure 6:
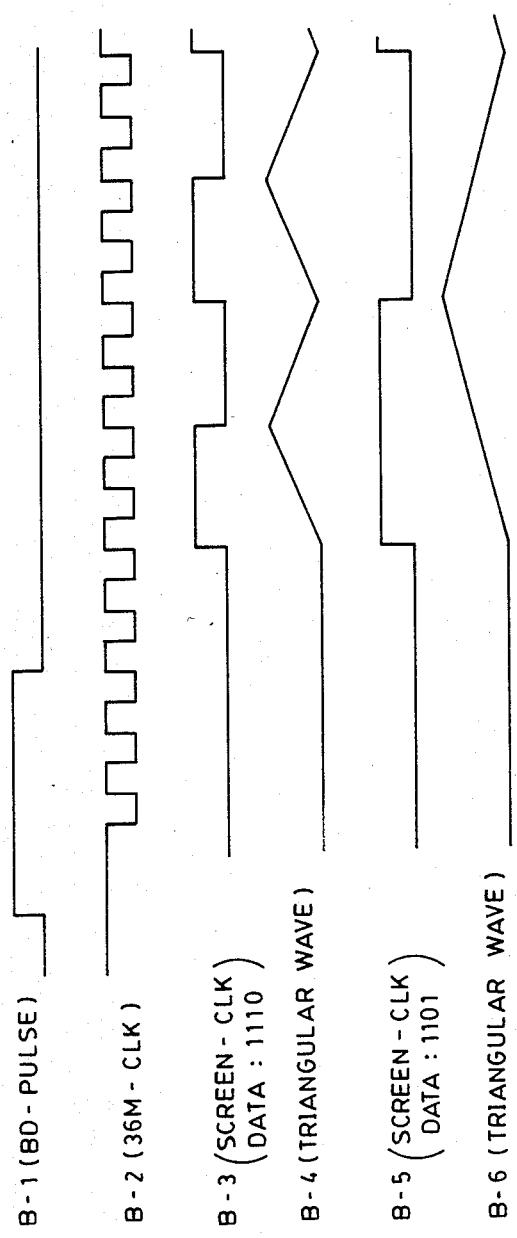
FIG. 6 is an illustration of triangular wave signals formed in the circuit shown in FIGS. 3A and 3B.

FIG. 6 shows waveforms of signals appearing at various components of the screen clock generating circuit 300. (It is noted, however, that the scales of FIGS. 5 and 6 are different). More specifically, B-1 shows the internal synchronizing signal (BD-PULSE), B-2 shows the signal (36M-CLK) and B-3 shows the screen clock (SCREEN CLK) as obtained when values "1", "1", "1", "0" are set in the terminals D, C, B, A of the counter 301, respectively. B-4 represents the triangular wave signal as obtained when the screen clock B-3 is used as the reference. On the other hand, B-5 shows the screen clock (SCREEN CLK) as obtained when values "1", "1", "0", "1" are set in the input terminals D, C, B, A of the counter 301. B-6 shows the triangular wave signal as obtained when the screen clock (SCREEN CLK) shown in B-5 is used as the reference obtained. It will be seen that the period of the triangular wave signal shown by B-4 corresponds to 2 (two) picture elements, while the period of the triangular wave signal shown by B-6 corresponds to 4 (four) picture elements. Thus, the period of the triangular wave signal can be varied as desired by appropriately setting the switch 303. In the embodiment described, the period of the triangular wave is changeable between a duration corresponding to 1 (one) picture element and a duration corresponding to 16 (sixteen) picture elements.

Figure 7:
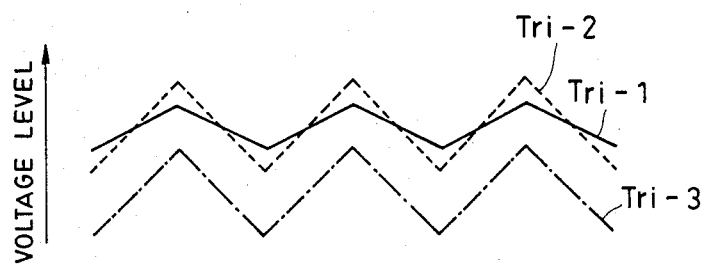
FIGS. 7(a) to 7(c) are illustrations of how triangular wave signals may be adjusted in the embodiment of the invention.
Figure 7:
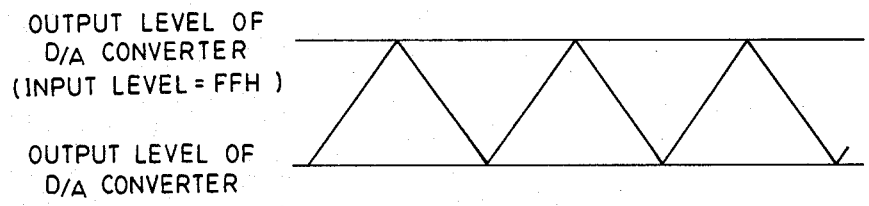
Figure 7:
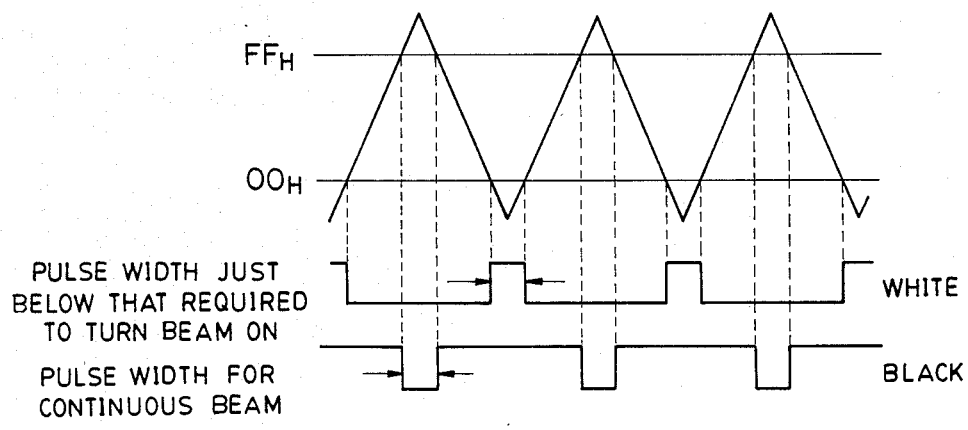

The triangular wave signal generating circuit 500 will now be described, again with reference to FIGS. 3A and 3B. The screen clock (SCREEN CLK) is received by the buffer 501, and the triangular wave is generated by an integrator comprising by a variable resistor 502 and a capacitor 503. The triangular wave signal is then delivered to one of the input terminals of the comparator 15 through a capacitor 504, a protective resistor 506, and a buffer amplifier 507. The triangular wave signal generating circuit 500 has two variable resistors, namely, variable resistor 502 for adjusting the amplitude of the triangular wave signal, and a variable resistor 505 for adjusting the bias or offset of the triangular wave signal. The adjustment of the amplitude and the offset of the triangular wave signal by the variable resistors 502 and 505 is conducted in a manner which will be explained with reference to FIGS. 7(a) to 7(c). In FIG. 7(a), a triangular wave signal Tri-1 before adjustment is shown by a solid line curve. By adjusting the variable resistor 502, the signal Tri-1 is changed into an amplified triangular wave signal Tri-2 shown by a broken line curve. Then, the variable resistor 505 can be adjusted to shift or adjust the offset of the wave so as to form a triangular wave signal Tri-3 shown by a one-dot-and-one-dash line curve. It is thus possible to obtain a triangular wave signal having the desired amplitude and offset.

As stated before, the triangular wave signal thus formed is compared by the comparator 15 with the output of the D/A converter 13, i.e., with the analog video signal. The relationship between the triangular wave signal and the analog video signal is preferably such that the maximum level of the triangular wave equals the level of the output of the D/A converter 13 as obtained when the input to the converter 13 has the maximum level (FFH, where H indicates a hexidecimal number), while the minimum value of the triangular wave signal equals the level of the output of the D/A converter 13 as obtained when the input to this converter has the minimum level (00H). Since the amplitude and the offset of the triangular wave can be controlled as desired, it is possible to obtain this preferred condition without difficulty.

More particularly, according to the invention, the amplitude and the offset of the triangular wave signal are adjusted in the following manner. In general, a laser driver for emitting a laser beam has a certain delay time in its operation. The delay time until the laser beam is actually emitted is further increased due to the beam emitting characteristics of the laser. Therefore, the laser does not start emitting the laser beam until the width of the pulse input to the driver exceeds a predetermined value. This means that, in the case where the input signal is a series of periodic pulses as in the case of the described embodiment, the laser does not emit a beam unless the input signal pulse has a duty ratio greater than a predetermined value. Conversely, when the duty ratio of the pulse is increased beyond a certain level, i.e., when the period of low level of the pulse is shortened, the laser tends to stay on, that is, the beam is continuously emitted. For these reasons, if the adjustment of the triangular wave signal is conducted in the manner shown in FIG. 7(b), the gradation levels around the minimum level (00H) and near the maximum level (FFH) are omitted from the 256 gradation levels of the input data which may be input to the D/A converter 13, so that the gradation deteriorates undesirably. In the embodiment described, therefore, the variable resistors 502 and 505 are adjusted so that the pulse width just below that which will cause the laser to begin emission is obtained at the OOH level of the data input to the D/A converter 13, and so that the pulse width which will render the laser continuously on is obtained at the FFH level of the data input to the D/A converter 13. This manner of adjustment of the variable resistors 502 and 505 is shown in FIG. 7(c).

As will be understood from FIG. 7(c), this preferred embodiment is designed so that the comparator 15 produces an output pulse of a certain pulse width (a pulse width just below that which will cause the laser to begin emission) when the minimum input data OOH is supplied to the D/A converter 13. The preferred embodiment is also designed so that, when the maximum input data FFH is supplied to the D/A converter 13, the comparator produces output pulses the duty ratio of which is not 100% but which is large enough to allow the laser to emit the beam continuously. This arrangement permits the emission time of the laser to vary nearly over the entire range of the 256 gradation levels of the input data, thus ensuring high gradation of the reproduced image.

It should be understood that the method described above is not limited to a laser printer but may also be utilized in to an ink jet printer, a thermal printer or other raster scanning devices.

The ROM 12 for gamma conversion will now be explained in detail with reference to FIG. 8. The ROM 12 is provided to allow a high gradation of density in the reproduced image. Although the described embodiment employs a ROM having a capacity of 256 bytes as ROM 12, a capacity of 64 bytes is basically enough because the input digital video signal is a 6-bit signal. FIG. 8 shows the memory map of the ROM 12 for gamma conversion. Since this ROM has a capacity of 256 bytes, it can contain 4 (four) separate correction tables, namely TABLE-1 including addresses OOH to 3FH, TABLE-2 including addresses 4OH to 7FH, TABLE-3 including addresses 8OH to BFH, and TABLE-4 including the addresses COH to FFH.

Figure 9:
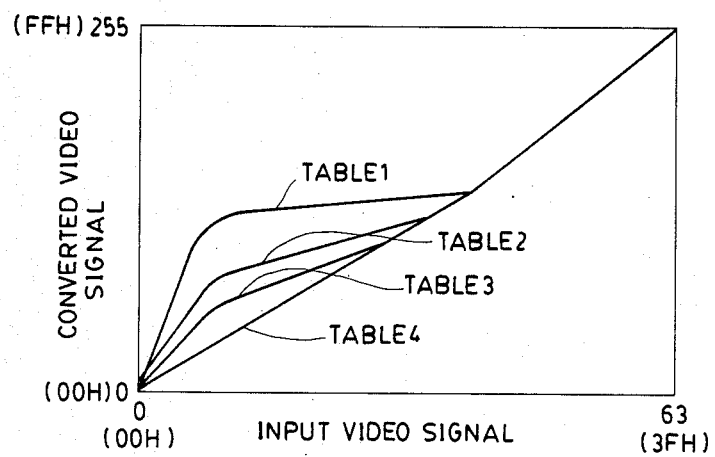
FIG. 9 is a diagram showing the relationship between input video signals and converted video signals.

FIG. 9 shows a practical example of the input-output characteristics of each of the conversion tables, i.e., the relationship between the input video signals and the converted output video signal. As will be seen from this Figure, the 64 (sixty-four) levels of the input video signal are converted into levels 0 to 255 (OOH to FFH) in accordance with the respective conversion tables. The change-over between the conversion tables can be made by varying the signal applied to upper terminals A6 and A7 of the ROM 12 as shown in FIGS. 3A and 3B. The described embodiment is designed to allow this switching for each line, by the operation of a circuit 400 shown in FIG. 3A. In operation, the internal horizontal synchronizing signal (BD-Pulse) is input to a counter 401 the output of which is delivered through terminals QA and QB to the terminals A6 and A7 of the ROM 12. The counter 401, in cooperation with an RCO inverter 402 and a switch 403 constitutes a ring counter, so that the period of switching of the conversion table can be varied in accordance with the state of the switch 403. For instance, when the switch 403 has the state "1" (at terminal B), "1" (at terminal A), TABLE-4 is always selected, whereas, when the state of the switch 403 is "1" (at terminal B), "0" (at terminal A), TABLE-4 and TABLE-3 are selected alternately. When the switch 403 has the state of "0" (at terminal B), "0" (at terminal A), TABLE-1, TABLE-2, TABLE-3, and TABLE-4 are successively selected for successive lines, as shown in FIG. 10a. Moreover, it is possible to improve the gradation by changing the conversion table for successive lines.

In general, in the electrophotographic reproduction of an image, the gradation is more difficult to obtain in the light portion of the image than in the dark portion of the image. Therefore, as in the example shown in FIG. 9, the conversion tables are substantially duplicated in the dark portions of the image and differ in the light portion so as to provide optimal gradation.

In the preferred embodiment, the switching of the table can also be made in the direction of the main scan by the laser beam.

More specifically as shown in FIGS. 3A and 3B, a signal can be formed by dividing the frequency of the screen clock (SCREEN-CLK) by 2 (two) by means of a J-K flip-flop circuit 404, inputting the resulting signal to one input terminal of an exclusive OR circuit 406, the other input of which is connected to terminal QB of the counter 401 and the output terminal of which is then connected to ROM 12 through a latch 11. With this arrangement, it is possible to change the conversion table in a staggered manner as shown in FIG. 10(b), thus attaining a further improvement in the gradation. A reference numeral 405 denotes a switch for selecting either switching of the table in the staggered manner described above or not so switching. The staggered switching of the table is selected when this switch has the "1" level and is not selected when the switch has the "0" level. The numerals appearing in frames of the table shown in FIG. 10(b) represent the numbers of the selected conversion tables 1 to 4. Thus, the period of the screen clock in the embodiment corresponds to the period of 3 (three) pixel clocks.

It will be understood from the description provided above that the scanning lines produced by the laser in accordance with data from the conversion tables of the ROM 12 are each generated as a succession of line segments. The line segments of successive scanning lines collectively form a plurality of columns that define a line screen.

More particularly, when the video signal processed by the circuit shown in FIGS. 3A and 3B is directly delivered to a reproducing means such as a laser beam printer, the reproduced image has a structure with vertical columns (in the described embodiment, the line screen is composed of vertical columns of line segments of successive scanning lines which form in the reproduced image) due to the fact that the phase of the triangular wave signal is the same as that of the internal horizontal synchronizing signal (BD-Pulse) for each line. The circuit in the present embodiment is one in which the triangular wave is formed after the reference clocks are counted by 12 (twelve) from the rise of the BD-Pulse signal. The timing for the generation of triangular waves is the same for each line, and so each phase of the triangular waves on each line is the same. The image data is output from the digital data output device 1 as stated above. The digital data output device 1 outputs image data with a predetermined timing in synchronism with a signal equivalent to the BD-Pulse signal. More particularly, the data output device 1 is adapted to receive the BD signal. This device 1 starts to count the reference clock after receiving the BD signal, and begins transmission of the image data after counting the reference clocks up to a predetermined number. As a consequence, the timing of transfer of the image data necessary for image reproduction is the same on each line, and a high quality reproduced image with no image jitter can be produced. As the timing of the generation of the triangular waves and the timing of transfer of the image data necessary for image reproduction have the same relation on all of the lines, the reproduced image has its vertical column structure with no image jitter, which is effective, for example, in reducing a particular Moire pattern. Again this vertical column structure comprises a line screen having a vertical columnar axis extending at an angle, that is perpendicular to the raster scanning lines.

Figure 11:
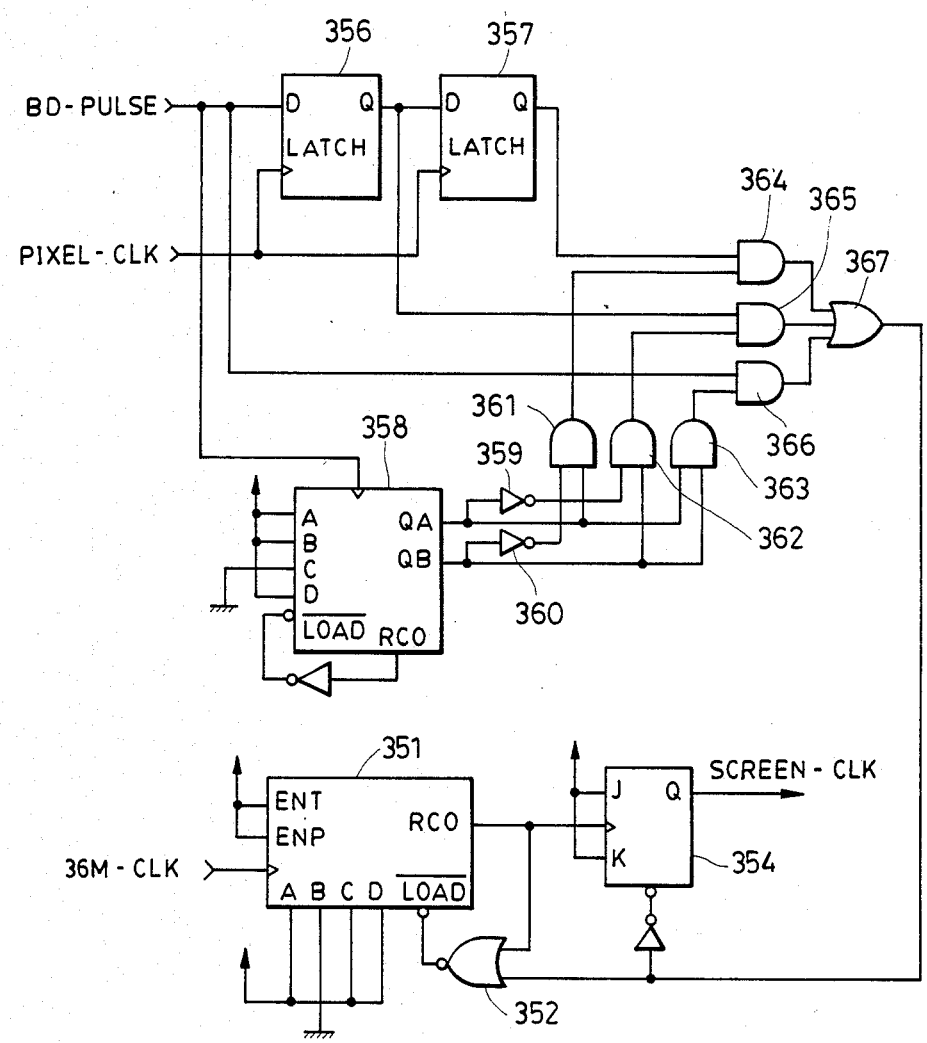
FIG. 11 is a circuit diagram of a circuit for causing phase shift of triangular wave signals between lines.

It is also possible to obtain a reproduced image having a structure comprising oblique line screen columns, if the phase of the triangular wave signals is made to be offset slightly for successive lines. This is effective in reducing the Moire pattern which appears undesirably when an original dot image is read and processed. The angle of inclination of the oblique columns can be determined as desired by suitably selecting the amount of shift of the phase of the screen clocks for successive lines. For instance, a reproduced image comprising scanning lines having oblique columns inclined at 45 degrees can be obtained by shifting the triangular wave signal by an amount corresponding to one picture element, i.e., by phase shifting the triangular wave signal 120 degrees for each of the successive columns. FIG. 11 shows a circuit for reproducing an image comprising oblique columns. More specifically, a reproduced image comprising oblique columns can be obtained by using this circuit in place of the screen clock generating circuit 300 in the circuit shown in FIG. 3.

Referring again to FIG. 11, the internal horizontal synchronizing signal (BD-Pulse) is latched by the pixel clocks (PIXEL-CLK) by means of D latches 356 and 357, so that three internal horizontal synchronizing signals (BD-Pulse) having different phases are produced. Then, one of these three internal horizontal synchronizing signals (BD-Pulse) is selected for each line by operation of a counter 358, inverters 359 and 360, and gate circuits 361 to 367. The selected signal is input as a LOAD signal to a counter 351, thereby changing the phase of the screen clocks for successive lines. The counter 351 is adapted to divide the frequency of the signal (36M-CLK) into ½, while the J-K flip-flop circuit 354 further divides the frequency of the output from the counter 351 into ½. With this arrangement, it is possible to generate one screen clock for every three picture elements.

Figure 12:
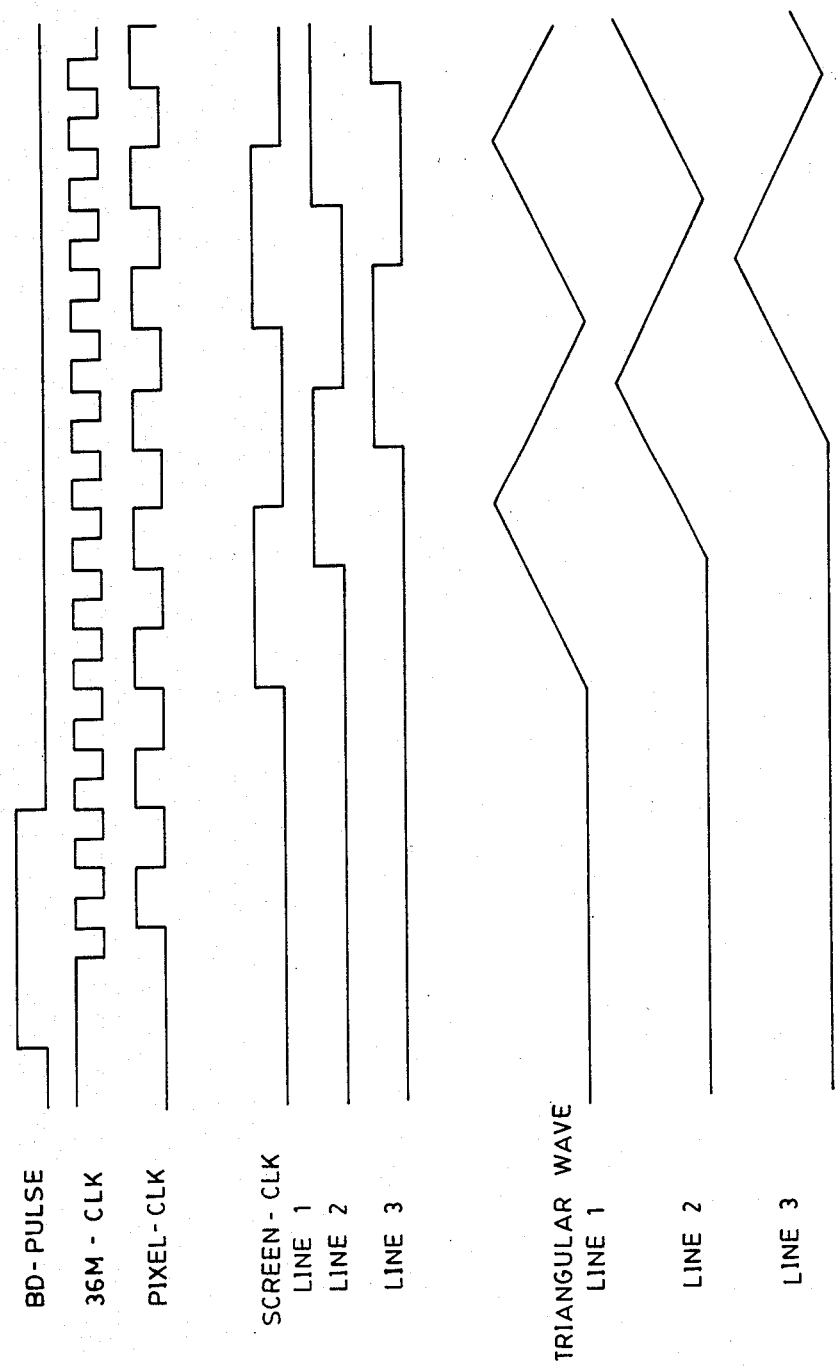
FIG. 12 is an illustration of triangular wave signals appearing in respective lines at different phases.

FIG. 12 shows timing of the screen clock generated by the circuit of FIG. 11 and the triangular wave signal for successive lines. These three triangular wave signals are generated in sequence of each set of each 3 lines.

When the reference pattern signal is generated in synchronism with a group of picture elements as in the case of the embodiment described, it is possible to shift the synchronizing signal used in the generation of the pattern signal by an amount corresponding to one half of the reference pattern signal period for each successive set of scan lines equal to the width of the pattern signal. Such a method allows the position of the center of growth of the pulse width to be shifted in each of successive lines, so that the output image can have an appearance resembling that produced by half-tone dots arranged along oblique lines.

In the circuit shown in FIGS. 3A and 3B, the ROM 12 is used for the purpose of gamma conversion. This, however, is not the only element suitable for this purpose and the ROM 12 may be replaced by an S-RAM connected to the DATA BUS line of a computer. With such an arrangement, it is possible to rewrite the gamma conversion table as desired in accordance with, for example, a change in the kind of the original, thus increasing the adaptability of the apparatus of the invention.

Figure 13:
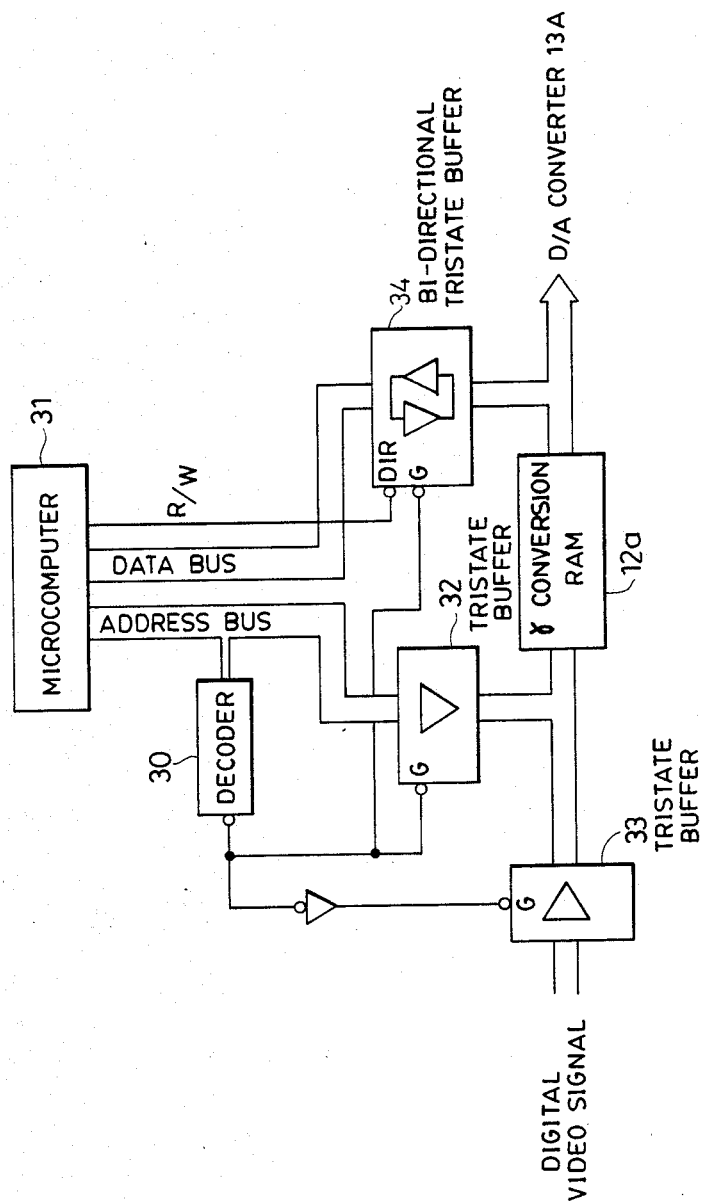
FIG. 13 is an illustration of another embodiment of the invention.

FIG. 13 shows an example of a circuit which is usable in place of the ROM 12 in the circuit shown in FIGS. 3A and 3B. This circuit has, as will be seen from this Figure, an S-RAM 12a for gamma conversion, a decoder 30, a microcomputer 31 for rewriting the gamma conversion tables, tri-state buffers 32 and 33, and a bi-directional tri-state buffer 34.

The mode changing switches 304, 403 and 405 in the circuit shown in FIGS. 3A and 3B may be controlled by the microcomputer 31 so as to increase the flexibility of the system as a whole.

Although the invention has been described with reference to specific embodiments and in specific terms it is to be understood that this description is only illustrative purposes and that various other changes and modifications are possible without departing from the scope of the invention.

What is claimed is;

1. An image processing apparatus responsive to a digital input signal, said apparatus comprising:
   a raster scanning print engine for generating a series of successive scan lines;
   means for generating a pulse-width-modulated signal from a digital input signal input to said apparatus; and
   means for applying said pulse-width-modulated signal to said print engine to cause said print engine to generate each said scan line as a succession of line-segments, the lengths of which are controlled in accordance with said pulse-width-modulated signal to produce a variable density line screen from said line segments, said line screen comprising a plurality of columns of said line segments.

2. An image processing apparatus responsive to a digital input signal, said apparatus comprising:
   a raster scanning print engine for generating a series of successive scan lines;
   means for generating a pulse-width-modulated signal from a digital input signal input to said apparatus; and
   means for applying said pulse-width-modulated signal to said print engine to cause said print engine to generate each said scan line as a succession of line-segments, the lengths of which are controlled in accordance with said pulse-width-modulated signal to produce a variable density line screen from said line segments, said line screen comprising a plurality of columns of said line segments, wherein said digital input signal ranges between maximum and minimum values and wherein said pulse-width-modulated signal generating means generates a pulse-width-modulated signal having a predetermined pulse width when said digital input signal has the minimum value.

3. An image processing apparatus according to claim 3 wherein the axes of said columns comprising said line screen are substantially perpendicular to said scan lines.

4. An image processing apparatus according to claim 2, wherein the axes of said columns comprising said line screen extend at an oblique angle to said scan lines.

5. Image processing apparatus according to claim 4, wherein said reference pattern signal generating means includes means for adjusting at least one of the amplitude and offset of said pattern signal.

6. An image processing apparatus according to claim 25, wherein said generating means includes converting means for converting said digital input signal to an analog video signal, reference pattern signal generating means for generating an analog reference pattern signal of predetermined period, and comparing means for comparing said converted analog video signal with said analog reference pattern signal and for generating said pulse-width-modulated signal on the basis of said comparison.

7. Image processing apparatus according to claim 6, wherein said reference pattern signal generating means generates as said pattern signal a triangular wave signal of predetermined period.

8. An image processing apparatus responsive to a digital input signal, said apparatus comprising:
a raster scanning print engine for generating a series of successive scan lines;
means for generating a pulse-width modulated signal from a digital input signal input to said apparatus; and
means for applying said pulse-width-modulated signal to said print engine to cause said print engine to generate each said scan line as a succession of line-segments, the lengths of which are controlled in accordance with said pulse-width-modulated signal to produce a variable density line screen from said line segments, said line screen comprising a plurality of columns of said line segments wherein said digital input signal ranges between maximum and minimum values and wherein said pulse-width-modulated signal generating means generates a pulse-width-modulated signal having a predetermined pulse width when said digital input signal has the maximum value.

9. Image processing apparatus according to claim 8, wherein the axes of said columns comprising said line screen are substantially perpendicular to said scan lines.

10. Image processing apparatus according to claim 8, wherein the axes of said columns comprising said line screen extend at an oblique angle to said scan lines.

11. Image processing apparatus according to claim 8, wherein said generating means includes converting means for converting said digital input signal to an analog video signal, reference pattern signal generating means for generating an analog reference pattern signal of predetermined period, and comparing means for comparing said converted analog video signal with said analog reference pattern signal and for generating said pulse-width-modulated signal on the basis of said comparison.

12. Image processing apparatus according to claim 11, wherein said reference pattern signal generating means includes means for adjusting at least one of the amplitude and offset of said pattern signal.

13. Image processing apparatus according to claim 11, wherein said reference pattern signal generating means generates as said pattern signal a triangular wave signal of predetermined period.

14. An image processing apparatus for forming an image on a recording medium, said apparatus comprising:
video signal output means for generating an analog-video signal;
pattern signal generating means for producing a pattern signal of predetermined period;
a pulse-width-modulated signal generating means for generating a pulse-width modulated signal in accordance with the analog video signal generated by said video signal output means and said pattern signal generated by said pattern signal generating means; and
image forming means for scanning lines on a recording medium with a beam in accordance with said pulse-width-modulated signal generated by said pulse-width modulated signal generated means thereby forming an image on said recording medium; said image forming means including means for generating a synchronizing signal for each line scanned on the recording medium, said pattern signal generating means generating the pattern signal of predetermined period in accordance with said synchronizing signal.

15. An image processing apparatus according to claim 14, wherein said pattern signal generating means generates as said pattern signal a triangular wave signal of predetermined period.

16. An image processing apparatus according to claim 14, further comprising reference clock generating means for generating a reference clock, said pattern signal generating means producing a clock for generating said pattern signal by dividing the frequency of said reference clock in accordance with said synchronizing signal.

17. Image processing apparatus according to claim 14, wherein said synchronizing signal generating means includes detecting means for detecting a scanning position of the beam and generates the synchronizing signal on the basis of a detection output from said detecting means.

18. Image processing apparatus according to claim 14, wherein said pattern signal generating means includes means for freely varying a period of the pattern signal generated.

19. Image processing means according to claim 18, wherein said pulse-width-modulated signal generating means includes means for comparing said analog video signal with said pattern signal and for generating said pulse-width modulated signal on the basis of the comparison result.

20. Image processing apparatus according to claim 14, wherein said pattern signal generating means includes timing changing means for changing a timing for generation of the pattern signal in association with the scanning line.

21. Image processing apparatus according to claim 14, wherein one period of said pattern signal corresponds to a plurality of pixels of the analog video signal.

22. An image processing apparatus according to claim 14 wherein said pattern signal generating means includes means for adjusting at least one of the amplitude and offset of said pattern signal.

23. An image processing apparatus according to claim 14, wherein said pattern signal generating means generates as said pattern signal a triangular wave signal of predetermined period.

24. Image processing apparatus according to claim 14, further comprising digital video signal generating means for generating a digital video signal, wherein said video signal output means includes digital-to-analog converting means for converting the digital video signal generated by said digital video signal generating means into the analog video signal.

25. Image processing apparatus according to claim 24, wherein said digital video signal ranges between maximum and minimum values and wherein said pulse-width-modulated signal generating means generates a pulse-width-modulated signal having a predetermined pulse width when said digital video signal has the minimum value.

26. Image processing apparatus according to claim 24, wherein said digital video signal ranges between maximum and minimum values and wherein said pulse-width-modulated signal generating means generates a pulse-width-modulated signal having a predetermined pulse width when said digital video signal has the maximum value.

27. Image processing apparatus according to claim 24, wherein said apparatus further comprises reference clock generating means for generating a reference clock, said pattern signal generating means producing a first clock for generating said pattern signal by dividing the frequency of said reference clock, and wherein said apparatus further comprises means for generating a second clock by dividing the frequency of the reference clock, said digital video signal generating means generating the digital video signal in synchronism with the second clock.

28. Image processing apparatus according to claim 27, wherein each of said first and second clocks is generated in accordance with the synchronizing signal.

29. Image processing apparatus according to claim 24, wherein said digital video signal generating means includes digital video signal output means for outputting a digital video signal having a characteristic, and characteristic converting means for converting the characteristic of said digital video signal output form said digital video signal output means and for producing a converted digital video signal therefrom and wherein said digital-to-analog converting means converts the converted digital video signal generated by said characteristic converting means into the analog video signal.

30. Image processing apparatus according to claim 29, wherein said characteristic converting means includes means for changing a factor for converting the characteristic of said digital video signal for each line scanned by said image forming means.

31. Image processing apparatus according to claim 30, wherein said factor changing means changes the factor in accordance with the synchronizing signal.

32. An image processing apparatus comprising:
digital video signal generating means for generating a digital video signal having a characteristic;
characteristic converting means for converting the characteristic of said digital video signal generated by said digital video signal generating means and for producing a converted digital video signal therefrom;
digital-to-analog converting means for converting the converted digital video signal generated by said characteristic converting means into an analog video signal;
pattern signal generating means for generating a pattern signal of predetermined period; and
pulse-width-modulated signal generating means for generating a pulse-width-modulated signal in accordance with said analog video signal and said pattern signal.

33. An image processing apparatus according to claim 32, wherein said digital video signal ranges between maximum and minimum values, and wherein said pulse-width-modulated signal generating means generates a pulse-width-modulated signal having predetermined pulse width when said digital video signal has the minimum value.

34. An image processing apparatus according to claim 32, wherein said digital video signal ranges between maximum and minimum values and wherein said pulse-width-modulated signal generating means generates a pulse-width-modulated signal having predetermined pulse width when said digital video signal has the maximum value.

35. An image processing apparatus according to claim 32 wherein said pattern signal generating means includes means for adjusting at least one of the amplitude and offset of said pattern signal.

36. Image processing apparatus according to claim 32 wherein said pattern signal generating means includes means for freely varying a period of the pattern signal generated.

37. Image processing means according to claim 32, wherein said pulse-width-modulated signal generating means includes means for comparing said analog video signal with said pattern signal and for generating said pulse-width modulated signal on the basis of the comparison result.

38. Image processing apparatus according to claim 32, wherein one period of said pattern signal corresponds to a plurality of pixels of the digital video signal.

39. An image processing apparatus according o claim 32, wherein said characteristic converting means comprises storage means containing digital information for providing at least one non-linear transformation of said digital video signal.

40. An image processing apparatus according to claim 39, wherein said storage means comprises a read only memory for storing a digital look-up table for gamma correction.

41. An image processing apparatus according to claim 32, further comprising image forming means for scanning successive lines on a recording medium with a beam in accordance with said pulse-width-modulated signal generated by said pulse-width-modulated signal generating means thereby forming an image on said recording medium, and wherein said characteristic converting means includes means for changing the factor converting the characteristic of said digital video signal for each of the successive lines scanned by said image forming means.

42. Image processing apparatus according to claim 41, wherein said pattern signal generating means includes timing changing means for changing a timing for generation of the pattern signal in association with the scanning line.

43. Image processing apparatus according to claim 41, wherein said image forming means includes means for generating a synchronizing signal for each line scanned on the recording medium, said pattern signal generating means generating the pattern signal of predetermined period in accordance with said synchronizing signal.

44. Image processing apparatus according to claim 37, wherein said synchronizing signal generating means includes detecting means for detecting a scanning position of the beam and generates the synchronizing signal on the basis of a detection output from said detecting means.

45. Image processing apparatus according to claim 43, wherein said factor changing means changes the factor in accordance with the synchronizing signal.

46. Image processing apparatus according to claim 43, further comprising reference clock generating means for generating a reference clock, said pattern signal generating means producing a clock for generating said pattern signal by dividing the frequency of said reference clock in accordance with said synchronizing signal.

47. An apparatus for generating an image from a digital video signal comprising:
   A. a raster scanning print engine for generating a series of successive scanning lines;
   B. a digital look up table addressable by said digital video signal;
   C. means for generating form: said digital video signal a pulse-width-modulated signal, said pulse-width-modulated signal generating means comprising:
      (1) means for applying said digital video signal as an address to said digital look up table for producing in accordance with said digital look up table a resultant gamma corrected digital signal;
      (2) means for converting said resultant gamma corrected digital signal to an analog video signal;
      (3) means for generating a periodic analog reference signal of predetermined period; and
      (4) means for comparing said analog video signal to said periodic analog reference signal thereby to produce said pulse-width-modulated signal; and
   D. means for applying said pulse-width modulated signal to said print engine for generating each said scanning line as a succession of line-segments, the length of which are controlled in accordance with said pulse-width-modulated signal to produce a variable density line screen from said line segments, an axis of symmetry of the line screen being substantially normal to the scanning lines.

48. An apparatus for generating an image from a digital video signal according to claim 47, wherein said periodic analog reference signal generating means is generates as said analog reference signal a triangular wave signal of a predetermined period.

49. An apparatus for generating an image according to claim 47, wherein said digital video signal ranges between maximum and minimum values and wherein said pulse-width-modulated signal generating means generates a pulse-width-modulated signal having a predetermined pulse width when said digital video signal has the minimum value.

50. An apparatus for generating an image according to claim 47, wherein said digital video signal ranges between maximum and minimum values and wherein said pulse-width-modulated signal generating means generates a pulse-width-modulated signal having predetermined pulse width when said digital video signal has the maximum value.

51. An apparatus for generating an image according to claim 47, wherein periodic analog reference signal generating means includes means for adjusting at least one of the amplitude and offset of said analog reference signal.

52. Apparatus according to claim 47, further comprising table changing means for changing the digital look up table utilized in association with the scanning line generated by said raster scanning print engine.

53. Apparatus according to claim 47, wherein one period of the analog reference signal corresponds to a plurality of pixels of the digital video signal.

54. Apparatus according to claim 19, wherein said raster scanning print engine includes image forming means for scanning lines on a recording medium with a beam in accordance with said pulse-width-modulated signal generated by said pulse-width-modulated signal generating means thereby forming an image on said recording medium, said image forming means including means for generating a synchronizing signal for each line scanned on the recording medium, said periodic analog reference signal generating means generating the periodic analog reference signal of predetermined period in accordance with said synchronizing signal.

55. Image processing apparatus according to claim 54, wherein said synchronizing signal generating means includes detecting means for detecting a scanning position of the beam and generates the synchronizing signal on the basis of a detection output from said detecting means.

56. An image processing apparatus responsive to a digital video signal input thereto, said apparatus comprising:
   a digital-to-analog converting means for converting the digital video signal input to said apparatus into an analog video signal;
   a pattern signal generating means for generating a pattern signal of a predetermined period; and
   a pulse-width-modulated signal generating means for generating a pulse-width-modulated signal in accordance with said converted analog video signal and said pattern signal.

57. An image processing apparatus according to claim 56, wherein said pattern signal generating means generates as said pattern signal a triangular wave signal of predetermined period.

58. Image processing apparatus according to claim 56, wherein said digital video signal ranges between maximum and minimum values and wherein said pulse-width-modulated signal generating means generates a pulse-width-modulated signal having a predetermined pulse width when said digital video signal has the minimum value.

59. Image processing apparatus according to claim 56, wherein said digital video signal ranges between maximum and minimum values and wherein said pulse-width-modulated signal generating means generates a pulse-width-modulated signal having a predetermined pulse width when said digital video signal has the maximum value.

60. Image processing means according to claim 56, wherein said pulse-width-modulated signal generating means includes means for comparing said analog video signal with said pattern signal and for generating said pulse-width modulated signal on the basis of the comparison result.

61. Image processing apparatus according to claim 56, wherein one period of said pattern corresponds to a plurality of pixels of the digital video signal.

62. Image processing apparatus according to claim 56, further comprising image forming means for forming an image by lines on a recording medium in accordance with said pulse-width-modulated signal generated by said pulse-width modulated signal generating means, said image forming means including means for generating a synchronizing signal for each line on the recording medium, said pattern signal generating means generating the pattern signal of predetermined period in accordance with said synchronizing signal.

63. Image processing apparatus according to claim 62, wherein said image forming means scans lines on the recording medium with a beam in accordance with said pulse-width-modulated signal, thereby forming the image on the recording medium, and wherein said synchronizing signal generating means includes detecting means for detecting a scanning position of the beam, and generates the synchronizing signal on the basis of a detection output form said detecting means.

64. Image processing apparatus according to claim 62, further comprising reference cock generating means for generating a reference clock, said pattern signal generating means producing a clock for generating said pattern signal by dividing the frequency of said reference clock in accordance with said synchronizing signal.

65. Image processing apparatus according to claim 62, wherein said pattern signal generating means includes timing changing means for changing a timing for generation of the pattern signal in association with each line.

66. Image processing apparatus according to claim 56, further comprising digital video signal input means for inputting the digital video signal having a characteristic and characteristic converting means for converting the characteristic of said digital video signal input by said digital video signal input means and for producing a converted digital video signal therefrom, wherein said digital-to-analog converting means converts the converted digital video signal generated by said characteristic converting means into the analog video signal.

67. Image processing apparatus according claim 66, herein said characteristic converting means includes a table for entering as an address the digital video signal input from said digital video signal input means, the converted digital video signal being produced from said table.

68. Image processing apparatus according to claim 67, wherein a plurality of tables for entering as an address the digital video signal input from said digital video signal input means are provided, and further comprising image forming means for scanning lines on a recording medium with a beam in accordance with said pulse-width-modulated signal generated by pulse-width-modulated signal generating means thereby forming an image on said recording medium, and table changing means for changing the table utilized in association with the scanning line.

69. Image processing apparatus according to claim 68, wherein said image forming means includes means for generating a synchronizing signal for each line scanned on the recording medium, and said table changing means changes the table in accordance with the synchronizing signal.

70. Image processing apparatus according to claim 69, wherein said synchronizing signal generating means includes detecting means for detecting a scanning position of the beam and generates the synchronizing signal on the basis of a detection output from said detecting means.

71. Image processing apparatus comprising:
digital video signal generating means for generating a digital video signal having a characteristic;
characteristic converting means for converting the characteristic of said digital video signal generated by said digital video signal generating means and for producing a converted digital video signal therefrom, said characteristic converting means including changing means for periodically changing a plurality of factors for converting the characteristic of said digital video signal at a predetermined interval thereby to convert the characteristic of said digital video signal generated by said digital video signal generating means and to produce said converted digital video signal by using said plurality of factors; and
image forming means for forming an image in accordance with said converted digital video signal, said image forming means forming said image by scanning digital video signal;
wherein said characteristic converting means uses the same ones of said plurality of factors for at least one scanning line scanned by said image forming means, and said changing means changes said plurality of factors after scanning of said at least one scanning line scanned by said scanning means.

72. Image processing apparatus according to claim 71, wherein said image forming means includes pulse-width-modulated signal generating means for generating a pulse-width-modulated signal in accordance with the converted video signal.

73. Image processing apparatus according to claim 71, wherein said characteristic converting means comprises storage means containing digital information for providing at least one non-linear transformation of said digital video signal.

74. Image processing apparatus according to claim 73, wherein said storage means comprises a read only memory for storing digital look-up table for gamma correction.

75. Image processing apparatus according to claim 71, wherein said characteristic converting means includes a table for entering as an address the digital video signal generated from said video signal generating means, the converted digital video signal being produced from the table.

76. Image processing apparatus according to claim 75, whenever a plurality of tables are provided for entering as an address the digital video signal generated from the video signal generating means, and wherein said changing means changes the table for each line scanned by said image forming means.

77. Image processing apparatus according to claim 76, wherein said image forming means includes digital-to-analog converting means for converting the converted digital video signal generated by said characteristic converting means into an analog video signal, pattern signal generating means for generating a pattern signal of predetermined period, pulse-width-modulated signal generating means for generating a pulse-width-modulated signal in accordance with said analog video signal and said pattern signal, and a raster scanning print engine for generating a series of successive scan lines with a beam in accordance with said pulse-width-modulated signal.

78. Image processing apparatus according to claim 77, wherein said digital video signal ranges between maximum and minimum values, and wherein said pulsewidth-modulated signal generating means generates a pulse-width-modulated signal having predetermined pulse width when said digital video signal has the minimum value.

79. Image processing apparatus according to claim 77, wherein said digital video signal ranges between maximum and minimum values and wherein said pulse-width-modulated signal generating means generates a pulse-width-modulated signal having predetermined pulse width when said digital video signal has the maximum value.

80. Image processing apparatus according to claim 77, wherein said pattern signal generating means includes an integrator for entering a clock having a predetermined period and for generating a triangular wave signal as the pattern signal on the basis of the clock having a predetermined period.

81. Image processing apparatus according to claim 77, wherein said image forming means includes means for generating a synchronizing signal for each line scanned on the recording medium, and said changing means changes the table in accordance with the synchronizing signal.

82. Image processing apparatus according to claim 81, wherein said synchronizing signal generating means includes detecting means for detecting a scanning position of the beam and generates the synchronizing signal on the basis of a detection output from said detecting means.

83. Image processing apparatus according to claim 81, wherein said pattern signal generating means generating the pattern signal of predetermined period in accordance with said synchronizing signal.

84. Image processing apparatus according to claim 81, wherein one period of said pattern corresponds to a plurality of pixels of the digital video signal.

85. Image processing apparatus for forming an image, said apparatus comprising:
video signal output means for generating an analog video signal;
pattern signal generating means for producing a pattern signal of predetermined period, one period of said pattern signal corresponding to a plurality of pixels of the analog video signal;
a pulse-width-modulated signal generating means for generating a pulse-width-modulated signal in accordance with the analog video signal generated by said video signal output means and said pattern signal generated by said pattern signal generating means; and
image forming means for forming an image in accordance with said pulse-width-modulated signal generated by said pulse-width-modulated signal generating means.

86. Image processing apparatus according to claim 85, wherein said pattern signal generating means generates as said pattern signal a triangular wave signal of predetermined period.

87. Image processing apparatus according to claim 85, herein said pattern signal generating means includes means for adjusting at least one of the amplitude and offset of said pattern signal.

88. Image processing apparatus according to claim 85, wherein said image forming means scans lines on the recording medium with a beam in accordance with aid pulse-width-modulated signal generated by said pulse-width-modulated signal generating means thereby forming an image on said recording medium, said image forming means including means for generating a synchronizing signal for each line scanned on the recording medium, said pattern signal generating means generating the pattern signal of predetermined period in accordance with said synchronizing signal.

89. Image processing apparatus according to claim 88, wherein said synchronizing signal generating means includes detecting means for detecting a scanning position of the beam and generates the synchronizing signal on the bases of a detection output from said detecting means.

90. Image processing apparatus according to claim 88, further comprising reference clock generating means for generating a reference clock, said pattern signal generating means producing a clock for generating said pattern signal by dividing the frequency of said reference clock in accordance with said synchronizing signal.

91. Image processing apparatus according to claim 85, further comprising digital video signal generating means for generating a digital video signal, wherein said video signal output means includes digital-to-analog converting means for converting the digital video signal generated by said digital video signal generating means into the analog video signal.

92. Image processing apparatus according to claim 91, wherein said digital video signal generating means includes digital video signal output means for outputting a digital video signal having a characteristics, and characteristic converting means for converting the characteristic of said digital video signal output from said digital video signal output means and for producing a converted digital video signal therefrom and wherein said digital-to-analog converting means converts the converted digital video signal generated by said characteristic converting means into the analog video signal.

93. Image processing apparatus according to claim 91, wherein said digital video signal ranges between maximum and minimum values and wherein said pulse-width-modulated signal generating means generates a pulse-width modulated signal having a predetermined pulse width when said digital video signal has the minimum value.

94. Image processing apparatus according to claim 91, wherein said digital video signal ranges between maximum and minimum values and wherein said pulse-width-modulated signal generating means generates a pulse-width-modulated signal having a predetermined pulse width when said digital video signal has the maximum value.

95. Image processing apparatus according to claim 91, wherein one period of the pattern signal corresponds to a plurality of pixels of the digital video signal.

96. Image processing apparatus according to claim 91, wherein said apparatus further comprises reference clock generating means for generating a reference clock, said pattern signal generating means producing a first clock for generating said pattern signal by dividing the frequency of said reference clock and wherein said apparatus further comprises means for generating a second clock by dividing the frequency of the reference clock, said digital video signal generating means generating the digital video signal in synchronism with the second clock.

* * * * *

UNITED STATES PATENT AND TRADEMARK OFFICE
CERTIFICATE OF CORRECTION

PATENT NO. : 4,800,442
DATED : January 24, 1989
INVENTOR(S) : JOHN H. RISEMAN, ET AL.   Page 1 of 4

It is certified that error appears in the above-identified patent and that said Letters Patent is hereby corrected as shown below:

COLUMN 4

Line 30, "per De." should read --per se.--.
    Line 52, "wit" should read --with--.

COLUMN 5

Line 57, "to an" should read --to as an--.

COLUMN 6

Line 67, "internal horizontal synchronizing (BD-Pulse)." should read --internal horizontal synchronizing signal (BD-Pulse).--.

COLUMN 8

Line 39, "hexidecimal" should read --hexadecimal--.

COLUMN 9

Line 29, "to" should be deleted.

COLUMN 12

Line 24, "only illustra-" should read --only for illustra- --.
    Line 28, "is;" should read --is:--.
    Line 67, "3" should read --2,--.

UNITED STATES PATENT AND TRADEMARK OFFICE
CERTIFICATE OF CORRECTION

PATENT NO. : 4,800,442
DATED : January 24, 1989
INVENTOR(S) : JOHN H. RISEMAN, ET AL.

It is certified that error appears in the above-identified patent and that said Letters Patent is hereby corrected as shown below:

COLUMN 13

Line 4, "claim 4," should read --claim 6,--.
    Line 9, "25," should read --2,--.

COLUMN 14

Line 4, "analog-" should read --analog--.
    Line 17, "pulse-width modulated signal generated means" should read --pulse-width-modulated signal generating means--.
    Line 46, "claim 18," should read --claim 14,--.
    Line 62, "claim 14" should read --claim 14,--.

COLUMN 15

Line 41, "form" should read --from--.

COLUMN 16

Line 20, "claim 32" should read --claim 32,--.
    Line 23, "claim 32" should read --claim 32,--.
    Line 27, "Image processing means" should read --Image processing apparatus--.
    Line 36, "o" should read --to--.

UNITED STATES PATENT AND TRADEMARK OFFICE
CERTIFICATE OF CORRECTION

PATENT NO. : 4,800,442
DATED : January 24, 1989
INVENTOR(S) : JOHN H. RISEMAN, ET AL.   Page 3 of 4

It is certified that error appears in the above-identified patent and that said Letters Patent is hereby corrected as shown below:

COLUMN 17

Line 23, "form:" should read --from--.
Line 49, "is" should be deleted.

COLUMN 18

Line 58, "Image processing means" should read --Image processing apparatus--.

COLUMN 19

Line 17, "form" should read --from--.
Line 19, "reference cock generating means" should read --reference clock generating means--.
Line 41, "herein" should read --wherein--.
Line 52, "by pulse-" should read --by said pulse- --.

COLUMN 20

Line 20, "ning digital" should read --ning lines on a recording medium in accordance with said converted digital--.
Line 39, "digital" should read --a digital--.
Line 48, "whenever" should read --wherein--.

UNITED STATES PATENT AND TRADEMARK OFFICE
CERTIFICATE OF CORRECTION

PATENT NO. : 4,800,442

DATED : January 24, 1989

INVENTOR(S) : JOHN H. RISEMAN, ET AL.

It is certified that error appears in the above-identified patent and that said Letters Patent is hereby corrected as shown below:

COLUMN 21

Line 32, "ating" should read --ates--.
Line 60, "herein" should read --wherein--.
Line 65, "aid" should read --said--.

COLUMN 22

Line 30, "characteristics," should read --characteristic,--.

Signed and Sealed this

Fourteenth Day of January, 1992

Attest:

HARRY F. MANBECK, JR.

*Attesting Officer*              *Commissioner of Patents and Trademarks*